United States Patent
Pieper et al.

(10) Patent No.: US 9,347,540 B2
(45) Date of Patent: May 24, 2016

(54) FLEXIBLE SHAFT DRIVE SYSTEM FOR CENTRIFUGE WITH PIVOTING ARMS

(75) Inventors: Gregory G. Pieper, Waukegan, IL (US); Salvatore Manzella, Barrington, IL (US); Daryl Calhoun, Gurnee, IL (US)

(73) Assignee: Fenwal, Inc., Lake Zurich, IL (US)

( * ) Notice: Subject to any disclaimer, the term of this patent is extended or adjusted under 35 U.S.C. 154(b) by 383 days.

(21) Appl. No.: 14/113,110

(22) PCT Filed: Aug. 27, 2012

(86) PCT No.: PCT/US2012/052469
§ 371 (c)(1),
(2), (4) Date: Oct. 21, 2013

(87) PCT Pub. No.: WO2013/043315
PCT Pub. Date: Mar. 28, 2013

(65) Prior Publication Data
US 2014/0033864 A1 Feb. 6, 2014

Related U.S. Application Data

(60) Provisional application No. 61/537,694, filed on Sep. 22, 2011.

(51) Int. Cl.
*B04B 9/08* (2006.01)
*F16H 37/06* (2006.01)
*B04B 5/04* (2006.01)

(52) U.S. Cl.
CPC ............ *F16H 37/065* (2013.01); *B04B 5/0442* (2013.01); *B04B 9/08* (2013.01); *B04B 2005/0492* (2013.01); *Y10T 74/19051* (2015.01)

(58) Field of Classification Search
CPC .. B04B 9/08; B04B 2009/085; B04B 5/0442; B04B 2005/0492
USPC ........... 494/17, 18, 21, 45, 83, 84; 210/380.1, 210/380.3, 781, 782; 138/111
See application file for complete search history.

(56) References Cited

U.S. PATENT DOCUMENTS 3,586,413 A * 6/1971 Adams .................. B04B 5/0442
359/212.2
3,986,442 A * 10/1976 Khoja ................... B04B 5/0442
474/150

(Continued)

FOREIGN PATENT DOCUMENTS

EP 0642834 A2 * 3/1995 ............ B04B 5/0442
WO WO 8801907 A1 * 3/1988 ............ B04B 5/0442

OTHER PUBLICATIONS
International Preliminary Report on Patentability for PCT/US2012/052469, dated Nov. 13, 2013.

*Primary Examiner* — Charles Cooley
(74) *Attorney, Agent, or Firm* — Cook Alex Ltd.

(57) ABSTRACT

A drive assembly for a centrifugal processing system is provided for rotating the yoke assembly (36) about a first axis at a first angular velocity and rotating the chamber assembly (30) coaxially with the yoke assembly at a second angular velocity A drive motor (60) is provided for rotating the yoke assembly at the first angular velocity A stationary gear (70) is mounted coaxially with the yoke assembly, with a drive linkage (72) comprising a shaft (74) secured to the yoke assembly so as to be rotatable therewith. The shaft is operatively connected on its first end to the stationary gear (70), so that the shaft rotates about its axis as the yoke assembly (36) rotates relative to the stationary gear. The shaft (74) is rotatably connected on its second end to the chamber assembly (30), so that when the shaft is rotated, the shaft rotates the chamber assembly. Preferably, the yoke assembly (36) comprises a first arm (38) and a second arm (40), with the chamber assembly (30) being rotatably secured to the first arm and the first arm being pivotably connected to the second arm, and the shaft (74) being flexible.

5 Claims, 3 Drawing Sheets

(56) References Cited

U.S. PATENT DOCUMENTS

| | | | | |
|---|---|---|---|---|
| 4,018,304 A * | 4/1977 | Lolachi | ............ | B04B 5/0442 184/6 |
| 4,108,353 A * | 8/1978 | Brown | ............ | B04B 9/08 494/18 |
| 4,109,852 A * | 8/1978 | Brown | ............ | B04B 5/0442 494/18 |
| 4,109,854 A * | 8/1978 | Brown | ............ | B04B 5/0442 494/18 |
| 4,109,855 A * | 8/1978 | Brown | ............ | B04B 9/08 494/18 |
| 4,113,173 A * | 9/1978 | Lolachi | ............ | A61M 1/3693 494/18 |
| 4,120,449 A * | 10/1978 | Brown | ............ | B04B 5/00 494/18 |
| 4,163,519 A * | 8/1979 | Stabile | ............ | B04B 5/0442 494/18 |
| 4,164,318 A * | 8/1979 | Boggs | ............ | B04B 5/0442 494/18 |
| 4,221,322 A * | 9/1980 | Drago | ............ | B04B 5/0442 494/18 |
| 4,425,112 A * | 1/1984 | Ito | ............ | B04B 5/00 494/18 |
| 4,459,169 A * | 7/1984 | Bacehowski | ............ | B04B 5/0442 138/111 |
| 4,540,397 A * | 9/1985 | Lolachi | ............ | B04B 9/08 494/18 |
| 4,710,161 A * | 12/1987 | Takabayashi | ............ | B04B 5/0442 494/10 |
| 4,778,444 A * | 10/1988 | Westberg | ............ | B04B 5/0442 494/18 |
| 4,936,820 A * | 6/1990 | Dennehey | ............ | B04B 5/0442 494/1 |
| 4,950,401 A * | 8/1990 | Unger | ............ | B04B 5/0442 210/360.1 |
| 5,350,514 A * | 9/1994 | Witthaus | ............ | B04B 5/0442 210/360.1 |
| 5,525,218 A * | 6/1996 | Williamson, IV | ............ | B04B 5/0442 210/232 |
| 5,547,453 A * | 8/1996 | Di Perna | ............ | B04B 7/02 494/45 |
| 5,551,942 A * | 9/1996 | Brown | ............ | B04B 5/0442 494/18 |
| 5,558,769 A * | 9/1996 | Witthaus | ............ | B04B 9/08 210/360.1 |
| 5,958,250 A * | 9/1999 | Brown | ............ | A61M 1/3693 210/745 |
| 5,961,842 A * | 10/1999 | Min | ............ | A61M 1/3693 210/110 |
| 5,980,757 A * | 11/1999 | Brown | ............ | B04B 5/0442 210/745 |
| 5,980,760 A * | 11/1999 | Min | ............ | B04B 5/0442 210/143 |
| 6,027,441 A * | 2/2000 | Cantu | ............ | A61M 1/3693 210/143 |
| 6,027,657 A * | 2/2000 | Min | ............ | A61M 1/3693 210/143 |
| 6,168,561 B1 * | 1/2001 | Cantu | ............ | A61M 1/3693 210/143 |
| 6,312,607 B1 * | 11/2001 | Brown | ............ | A61M 1/3693 210/745 |
| 6,582,349 B1 * | 6/2003 | Cantu | ............ | A61M 1/3693 210/109 |
| 6,709,377 B1 * | 3/2004 | Rochat | ............ | B04B 5/0442 494/10 |
| 9,101,944 B2 * | 8/2015 | Manzella | ............ | B04B 5/0442 |
| 2014/0033864 A1 * | 2/2014 | Pieper | ............ | B04B 5/0442 74/665 A |
| 2014/0038760 A1 * | 2/2014 | Manzella | ............ | B04B 5/0442 475/151 |
| 2014/0066282 A1 * | 3/2014 | Manzella | ............ | B04B 5/0442 494/84 |

\* cited by examiner

US 9,347,540 B2

FLEXIBLE SHAFT DRIVE SYSTEM FOR CENTRIFUGE WITH PIVOTING ARMS

CROSS REFERENCE TO RELATED APPLICATION

This application claims the benefit of U.S. patent application Ser. No. 61/537,694 filed Sep. 22, 2011, which is hereby incorporated herein by reference.

FIELD OF THE DISCLOSURE

The present disclosure relates to a centrifugal processing system, and, more particularly, to a drive system for a centrifuge for blood cell separation and collection.

BACKGROUND

Continuous blood cell separation and collection is a well-known process for collecting desired blood components, such as red blood cells, platelets or plasma, from a donor. Typically, whole blood is withdrawn from a donor and directed into a centrifugal processing chamber to separate the whole blood into its various therapeutic components. This is usually carried out utilizing blood processing systems and methods comprising a durable centrifuge in association with a single-use, sterile fluid circuit including a processing chamber and associated storage containers, fluid flow tubing, and the like. The processing chamber is usually mounted in a centrifuge rotor or bowl, which spins the chamber, creating a centrifugal field that separates the whole blood into its components based on their density.

A well-known and exemplary centrifugal blood processing system is the Amicus Separator, available from Fenwal, Inc. of Lake Zurich, Ill. The functional aspects of the Amicus Separator are disclosed in, e.g., U.S. Pat. Nos. 6,312,607 and 6,582,349, the entire disclosures of which are incorporated herein by reference.

In centrifugal processing system such as the Amicus, a centrifuge chamber assembly is rotatably mounted to a yoke, and a drive is provided such that the yoke is rotated at a first angular velocity (known in the field as the "one Omega" velocity) and the bowl rotates at a second angular velocity that is twice the first angular velocity (known as the "two Omega" velocity). This relationship of the centrifuge chamber having an angular velocity twice that of the yoke ensures that the bundle of tubings leading to and from the processing chamber that forms a part of the disposable processing fluid circuit (commonly called the "umbilicus") is not twisted by the rotation of the centrifuge.

In the centrifugal processing systems of the prior art, a first electric motor spins the yoke assembly at one Omega, while a second electric motor mounted to the yoke spins the centrifuge chamber assembly at the same speed of rotation, in the same direction, and about the same axis as the first electric motor spins the yoke assembly. As a result, when viewed from a stationary or non-rotating position, the centrifuge chamber spins at twice the rotational speed of the yoke assembly, thus providing for the one Omega-two Omega relationship between the yoke and centrifuge chamber. Such a drive system is described in U.S. Pat. No. 5,360,542, which is incorporated herein by reference.

By way of the present disclosure, an improved drive system for a centrifuge system is provided that utilizes a single motor to rotate both the yoke and the centrifuge chamber assembly.

SUMMARY

The present subject matter has a number of aspects which may be used in various combinations and the disclosure of one or more specific embodiments is for the purposes of disclosure and description, and not limitation. This summary only highlights a few of the aspects of the subject matter and additional aspects are disclosed in the accompanying drawings and the following detailed description.

By way of the present application, a drive assembly for a centrifugal processing system is provided that rotates a first structure (corresponding to the yoke assembly) about a first axis and at a first angular velocity, and rotates a second structure (corresponding to the chamber assembly) coaxially with the first structure at a second angular velocity. The drive assembly includes a drive motor for rotating the first structure at the first angular velocity. In keeping with a first aspect of the disclosure, a stationary gear is mounted coaxially with the first structure. A drive linkage comprising a shaft is secured to the first structure so as to be rotatable therewith, the shaft being operatively connected on a first end to the stationary gear so that the shaft rotates about its axis as the first structure is rotated relative to the stationary gear by the drive motor. The shaft is operatively connected on its second end to the second structure, so that when the shaft is rotated, the shaft rotates the second structure.

In another aspect of the disclosure, the first structure comprises a first arm and a second arm and the second structure is rotatably secured to the first arm, the first arm is pivotably connected to the second arm, and the shaft is flexible.

In accordance with another aspect of the disclosure, the second structure comprises a first pulley. A second pulley is mounted to the second end of the shaft, with the first and second pulleys being connected by a drive belt.

In a further aspect of the disclosure, the second end of the shaft may comprise a universal joint.

In another aspect of the disclosure, both the stationary gear and the first end of the shaft comprise intermeshing gears.

In a still further aspect of the disclosure, the ratio of the stationary gear to the gear associated with the first end of the shaft is substantially the same as the ratio of the first pulley to the second pulley, such that, upon rotation of the first structure by the drive motor, the angular velocity of the second structure will be twice the angular velocity of the first structure.

DETAILED DESCRIPTION

A more detailed description of the drive system for a centrifugal processing system in accordance with the present disclosure is set forth below. It should be understood that the description below of a specific device is intended to be exemplary, and not exhaustive of all possible variations or applications. Thus, the scope of the disclosure is not intended to be limiting, and should be understood to encompass variations or embodiments that would occur to persons of ordinary skill.

Figure 1:
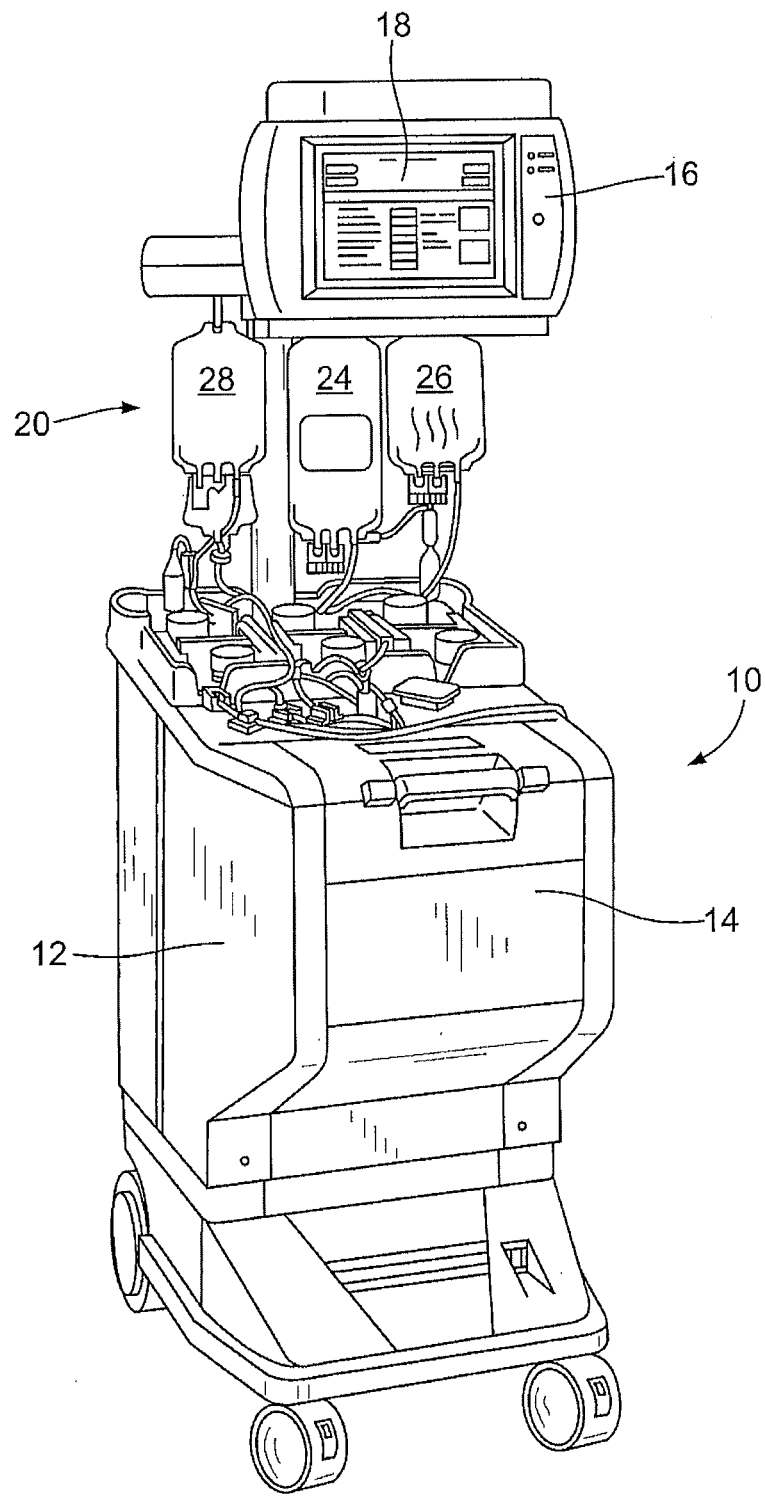
FIG. 1 is a perspective view of a centrifugal blood collection system that may advantageously utilize the drive system disclosed herein.

Turning to the drawings, there is seen in FIG. 1 a perspective view of a centrifugal blood separation system, generally designated 10. The system includes housing 12 for the centrifuge, including a compartment 14 within which the centrifuge is mounted and which is slidable relative to the housing to provide access to the centrifuge. A micro-processor based controller or control system 16 is supported above the housing that includes a user interface in the form of a touch screen 18, through which data can be input and operation of the centrifuge system is controlled.

A single-use/disposable collection kit 20 is used in combination with the system. The collection kit is typically made of a flexible plastic material, and includes, among other components, a processing container or chamber (not shown) that is mounted to the centrifuge. A tubing bundle, or umbilicus, 22 (best seen in FIGS. 2 and 3) connects the processing chamber to the donor, for withdrawing whole blood from the donor for introduction into the processing chamber/container and returning selected blood components to the donor. Additional tubings connect prefilled solution bags 24, 26, for saline and anticoagulant that are suspended above the centrifuge housing, as well as a collection bag 28 for receiving the blood component that has been separated in the centrifuge from the whole blood.

Figure 2:
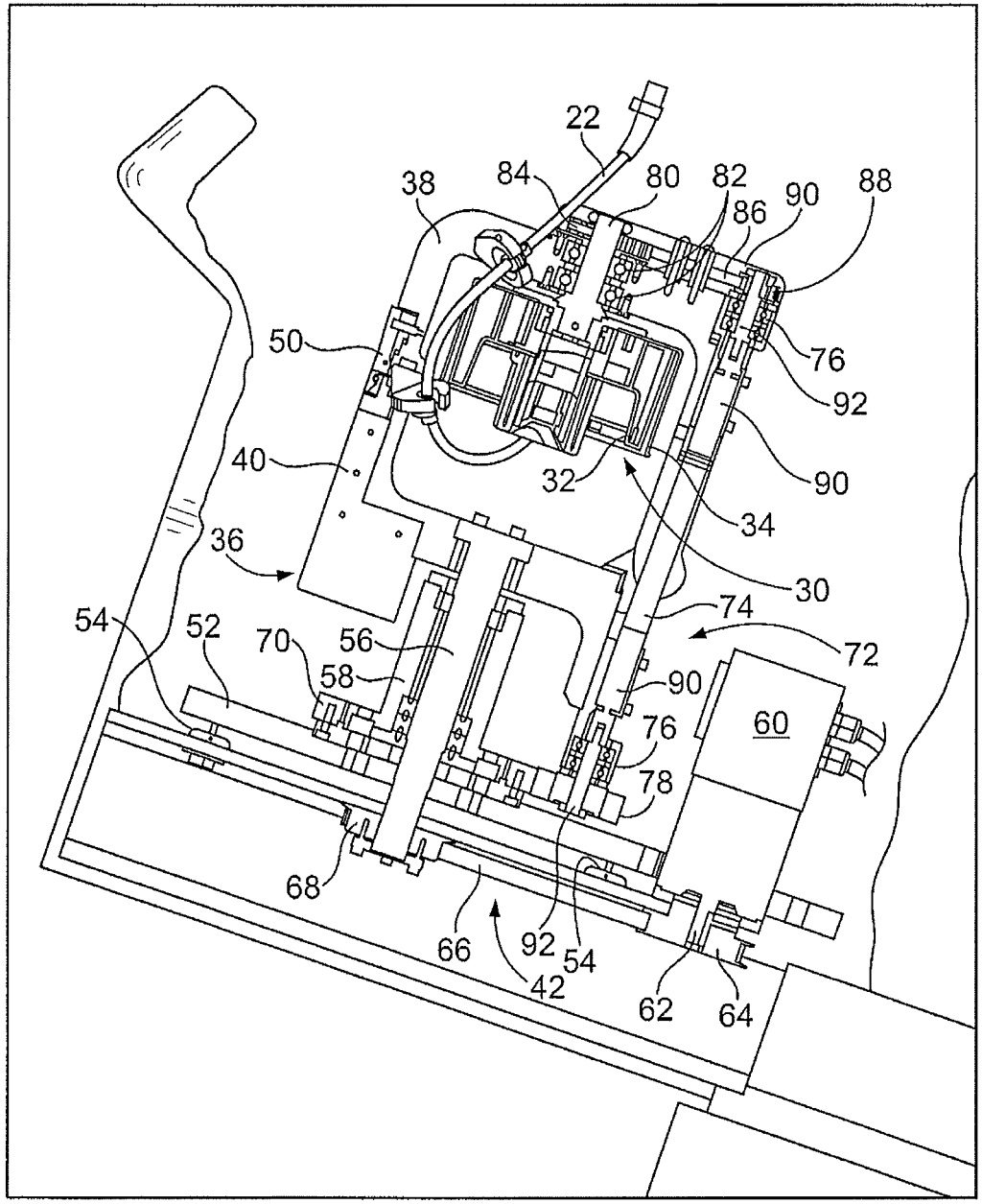
FIG. 2 is a side elevational view, with portions broken away and shown in cross-section to show detail of the separation chamber of the centrifuge system of FIG. 1, with the bowl and support elements in their closed or operating position.
Figure 3:
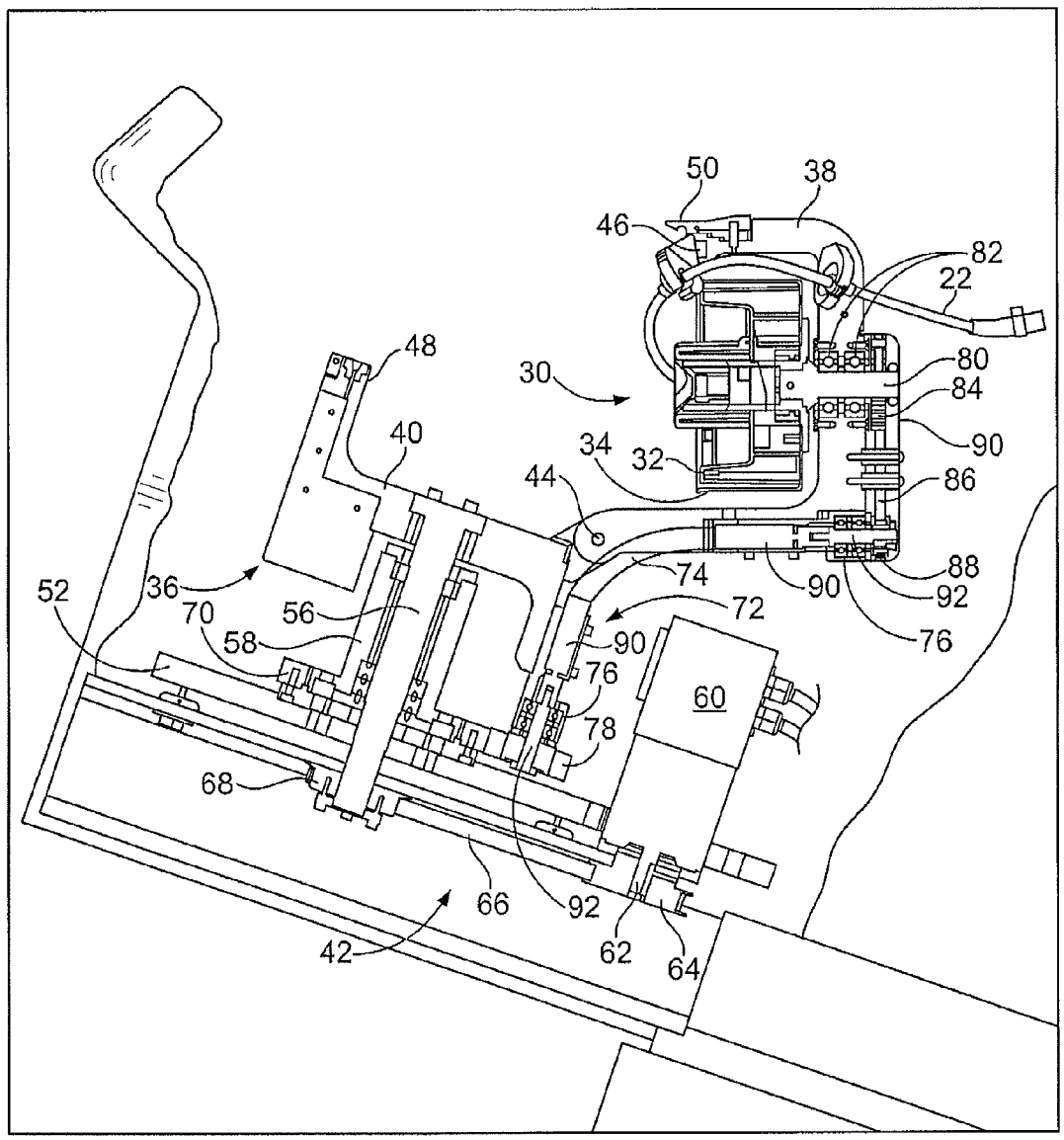
FIG. 3 is a side elevational view similar to FIG. 2 with bowl and support elements in their upright position for facilitating the mounting or removal of a single-use blood processing chamber.

Turning to FIGS. 2 and 3, the centrifuge system 10 includes a centrifuge chamber assembly, generally designated 30, comprising a spool 32 to which the processing chamber is mounted. The spool 32 is removably inserted into a bowl element 34 with the processing chamber wrapped about the spool 32. In operation, the spool 32 and bowl 34 are rotated in unison about a common axis. More specifically, the chamber assembly 30 is mounted to a yoke assembly, generally designated 36, so as to be movable between an open position (FIG. 3) to facilitate attachment and removal of the spool/processing chamber to the bowl 34, and a generally inverted position (FIG. 2), in which the processing chamber is enclosed between the spool 32 and the bowl 34, for operation of the centrifuge system.

In the illustrated embodiment, the yoke assembly 36 includes a first arm 38, to which the chamber assembly 30 is attached, that is pivotally secured to a second arm 40 that is mounted to the yoke assembly drive system generally designated 42, which will be described in greater detail below. The first arm 38 of the yoke assembly 36 is pivoted about a hinge pin 44 (best seen in FIG. 3) to permit the chamber assembly 30 to be moved to the open position for access to the processing chamber. In use, the first arm 38 is pivoted with respect to the second arm 40 with the free end 46 of the first arm being connected to the free end 48 of the second arm with a latch mechanism 50.

In keeping with one aspect of the present disclosure, a drive assembly is provided for rotating a first structure (i.e., the yoke assembly) about its axis at a first angular velocity and simultaneously rotating a second structure (i.e., the centrifuge chamber assembly) coaxially with the first structure at a second angular velocity.

To rotate the yoke assembly at the first angular velocity (at one Omega), the yoke assembly 36 of the illustrated embodiment is secured to a mounting plate 52 that is secured within the cabinet 12 of the centrifuge system 10 on vibration absorbing mounts 54. More specifically, the yoke assembly 36 is preferably secured to a drive shaft 56 that is rotatably supported in a journal box/platform 58 that is secured to the mounting plate 52. A drive motor 60 is also preferably secured to the mounting plate 52, with the drive shaft 62 of the drive motor 60 having a pulley 64 associated therewith that is connected by a belt 66 to a pulley 68 secured to the drive shaft 56 for the yoke assembly 36 to impart the one Omega angular velocity to the yoke assembly 36. Other means for rotating the yoke assembly drive shaft 56 may be provided as may occur to a person skilled in the art, such as a direct drive in which the drive motor drive shaft also comprises the yoke assembly drive shaft.

In order to rotate the centrifuge chamber assembly 30 relative to the yoke assembly 36, a stationary gear 70 preferably is secured to the mounting plate 52 coaxially with the yoke assembly 36. (While the term "gear" is being used, it is not intended to limit the understanding of a "gear" structure to a toothed-wheel or the like. Instead, it is intended to broadly cover all structures that would occur to a person skilled in the art that operatively connect a drive structure and a driven structure to one another to impart rotation from one to the other. As such, "gear" is intended to cover toothed structures as well as pulleys and wheels in combination with belts and chains or the like.)

In keeping with one aspect of the disclosure, a drive linkage, generally designated by 72, operatively connects the stationary gear 70 to the centrifuge chamber assembly 30 to impart rotation thereto. The drive linkage 72 preferably comprises a shaft 74 mounted to the yoke assembly 36 such that the shaft 74 both rotates in unison with the yoke assembly 36 about the axis of rotation of the yoke assembly and is capable of rotation relative to the yoke assembly. Accordingly, the opposite ends of the shaft 74 in the illustrated embodiment are preferably captured in bearing assemblies 76 mounted to the yoke assembly 36.

The first or lower end of the shaft 74 preferably carries a gear 78 that is operatively connected to the stationary gear so that the shaft is rotated as the yoke assembly rotates relative to the stationary gear 70. The stationary gear 70 and shaft gear 78 are preferably operatively connected by intermeshing teeth, although, as noted above, other means, such as pulleys, wheels, belts and chains, and the like, can be used to the same effect.

To impart rotation to the centrifuge assembly 30 relative to the yoke assembly 36, the shaft 74 is operatively connected to the chamber assembly. As shown in the illustrated embodiment, the centrifuge chamber assembly is carried on a drive shaft 30 mounted in bearing assemblies 82 carried by the yoke assembly 36 to facilitate relative rotation therebetween. A first pulley 84 preferably is secured to the end of the chamber assembly drive shaft 80 that is operatively connected by a belt 86 to a second or timing pulley 88 preferably carried on the upper or second end of the shaft 74. As seen in the figures, the belt and pulley assembly may be covered by a guard or housing 90.

In order to rotate the chamber assembly 30 at one Omega relative to the yoke assembly 36 (and to thus obtain the one Omega: two Omega relationship of the angular velocity of the yoke assembly to the chamber assembly), the ratio of the stationary gear 70 to the shaft gear 78 should be the same as the ratio of the chamber assembly pulley 84 to the timing pulley 88.

In keeping with another aspect of the disclosure, it is desireable that the centrifuge chamber assembly 30 be susceptible to relatively easy access for installation and removal of the processing chamber. To this end, the yoke assembly comprises two arms. As described above, the first arm 38 to which the chamber assembly is mounted is pivotally secured to the second arm 40 by a hinge pin 44 so as to permit pivotable motion of the first arm relative to the second arm between a first position (shown in FIG. 3) for installation and removal of the processing chamber, and a second position (shown in FIG. 2) for operation of the centrifuge. To secure the yoke assembly and the operational position, the free ends of the first and second arms may include the latch member 50.

Additionally, the shaft 74 preferably is flexible to accommodate the pivoting of the first arm 38 of the yoke assembly 36 relative to the second arm 40. In the illustrated embodiment, the shaft comprises a flexible intermediate member secured at its opposite ends to rigid tubular sleeves 90. The tubular sleeves 90 are, in turn, secured to the axles or shafts 92 for the pulley 88 and gear 78. The flexible intermediate portion of the drive shaft 74 preferably comprises a flexible, yet torsionally stiff material (e.g., wound steel wire), but may comprise other materials having the requisite strength, flexibility and fatigue-resistance characteristics. Optionally, one or both of the tubular sleeves 90 may be connected to its respective pulley/gear shaft by a universal joint, thus reducing the strain to which the sleeve would otherwise be subjected.

Thus, an improved drive system for a centrifuge has been disclosed. The description provided above is intended for illustrative purposes only, and is not intended to limit the scope of the invention to any particular embodiment described herein. As would be obvious to those skilled in the art, changes and modifications may be made without departing from a disclosure in its broader aspects. Thus, the scope is to be as set forth in the following claims.

The invention claimed is:

1. A drive assembly for rotating a first structure about a first axis at a first angular velocity and rotating a second structure coaxially with the first structure at a second angular velocity comprising:
   a drive motor for rotating the first structure at the first angular velocity;
   a stationary gear mounted coaxially with the first structure; and a drive linkage comprising a shaft secured to the first structure so as to be rotatable therewith, the shaft being operatively connected on a first end to the stationary gear so that the shaft is rotated about its axis as the first structure is rotated relative to the stationary gear by the drive motor, the shaft being operatively connected on a second end to the second structure so that when the shaft is rotated, the shaft rotates the second structure, wherein the first structure comprises a first arm and a second arm, the second structure being rotatably secured to the first arm and the first arm being pivotably connected to the second arm, and the shaft being flexible to accommodate the pivoting of the first arm to the second arm.

2. The drive assembly of claim 1 wherein the second structure comprises a first pulley and wherein a second pulley is mounted to the second end of the shaft, the first and second pulleys being connected by a drive belt.

3. The drive assembly of claim 2 wherein both the stationary gear and the first end of the shaft comprise intermeshing gears.

4. The drive assembly of claim 3 wherein the ratio of the stationary gear to the gear associated with the first end of the shaft is substantially the same as the ratio of the first pulley to the second pulley, such that the angular velocity of the second structure is twice the angular velocity of the first structure.

5. A centrifuge system having a drive assembly in accordance with claim 1 in which the first structure is a yoke and the second structure is a chamber assembly.

\* \* \* \* \*